No. 860,994. PATENTED JULY 23, 1907.
A. S. ROWSEY.
WHEELED SCRAPER.
APPLICATION FILED AUG. 20, 1906.
2 SHEETS—SHEET 1.
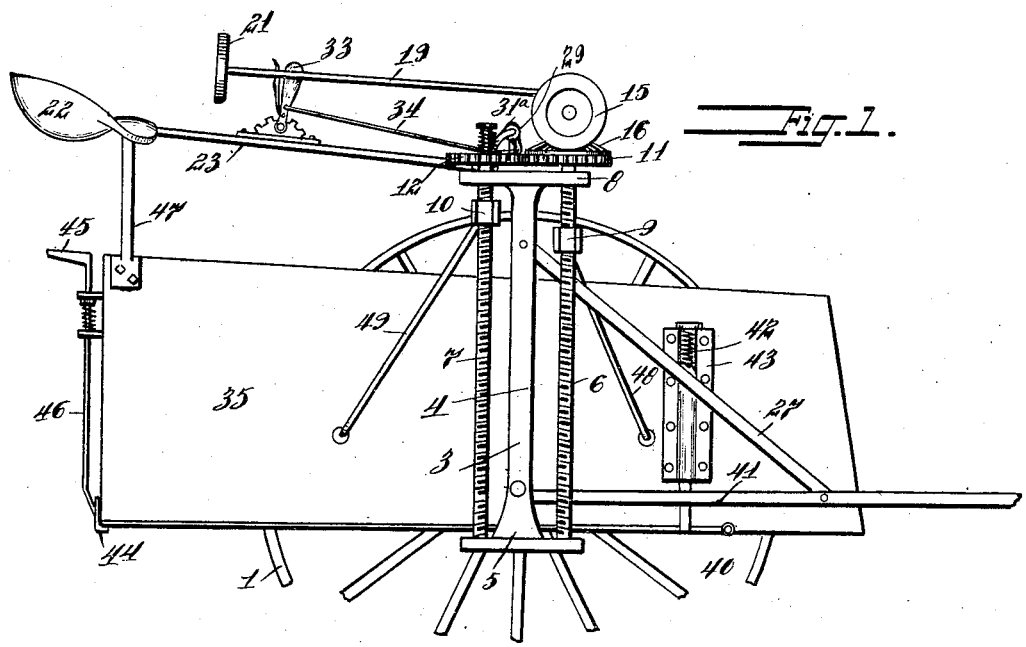
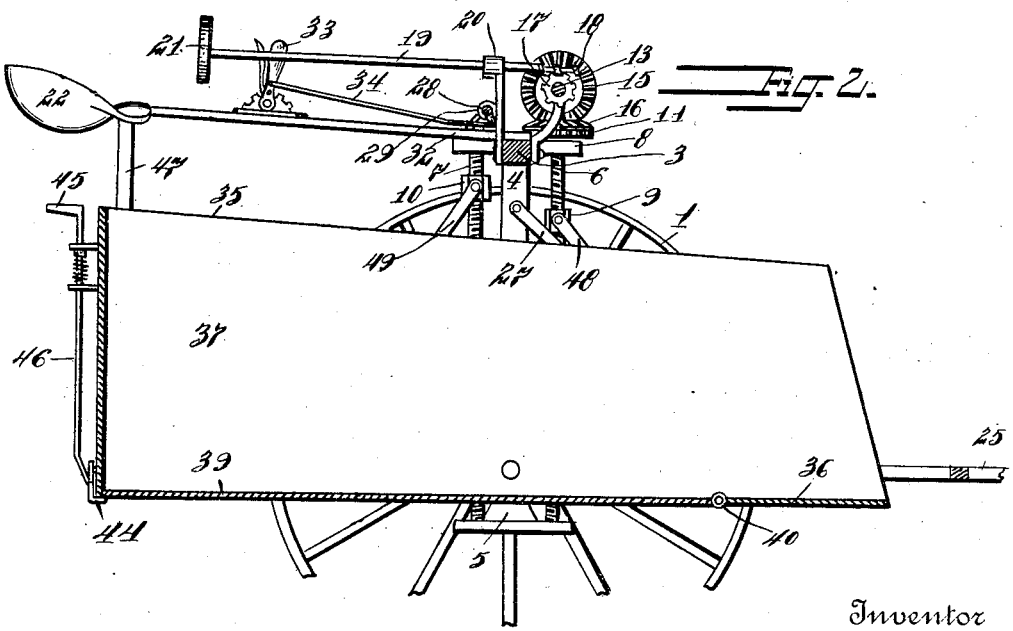
Witnesses
Helge H. Murray
L. C. Hilton
Inventor
A. S. Rowsey
by H. B. Willson & Co
Attorneys No. 860,994. PATENTED JULY 23, 1907.
A. S. ROWSEY.
WHEELED SCRAPER.
APPLICATION FILED AUG. 20, 1906.
2 SHEETS—SHEET 2.
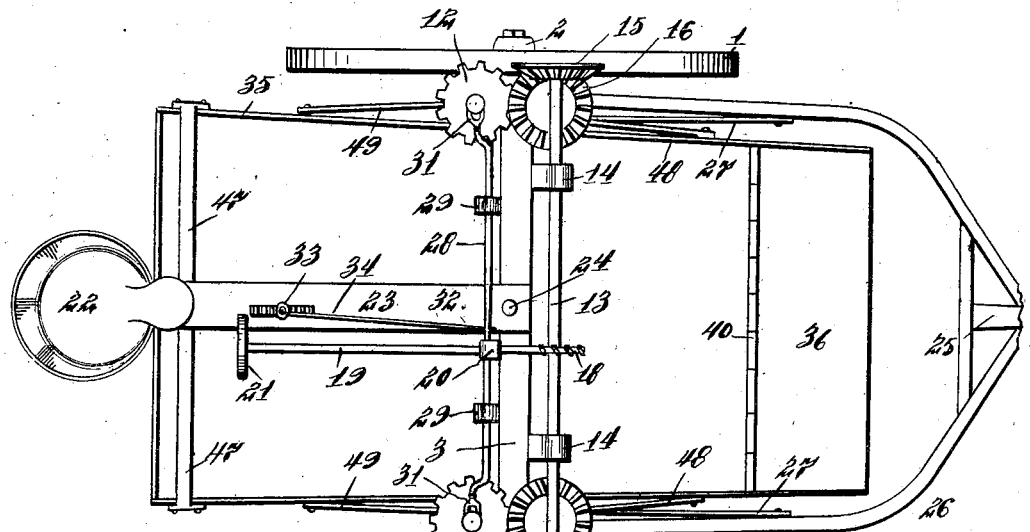
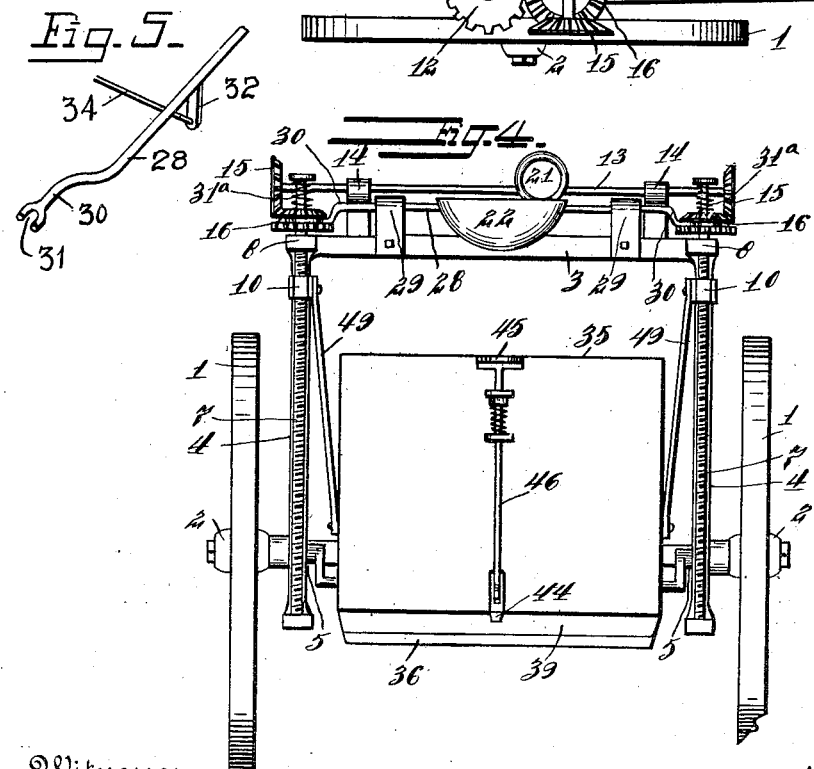
Witnesses
Inventor
A. S. Rowsey

UNITED STATES PATENT OFFICE.

ADAM S. ROWSEY, OF HELMVILLE, MONTANA.

WHEELED SCRAPER.

No. 860,994.

Specification of Letters Patent.

Patented July 23, 1907.

Application filed August 20, 1906. Serial No. 331,353.

*To all whom it may concern:*

Be it known that I, ADAM S. ROWSEY, a citizen of the United States, residing at Helmville, in the county of Powell and State of Montana, have invented certain new and useful Improvements in Wheel-Scrapers; and I do declare the following to be a full, clear, and exact description of the invention, such as will enable others skilled in the art to which it appertains to make and use the same.
My invention is an improved wheeled scraper, and it consists in the construction, combination, and arrangement of devices hereinafter described and claimed.

In the accompanying drawings,—Figure 1 is a side elevation of a wheeled scraper embodying my invention, with the near wheel removed; Fig. 2 is a vertical longitudinal sectional view of the same; Fig. 3 is a top plan view of the same; Fig. 4 is a rear elevation of the same, and Fig. 5 is a detail perspective view of the rock shaft 28 and its connections.
The supporting wheels 1 are journaled on the spindles 2 of an arched axle 3, the vertical arms 4 of which are provided at their lower ends with inwardly-extending brackets 5. At each end of the axle is a pair of elevating screws 6, 7, having their bearings at their lower ends in the brackets 5, and having their upper portions journaled in bearings 8, with which the horizontal arched portion of the axle is provided. The screw threads on the said screws 6 run in the reverse direction from those on the screws 7 and said screws 6, 7, are respectively in front and rear of the arched axle. Each screw 6 operates a traveling nut 9. Each screw 7 operates a traveling nut 10. At the upper ends of the screws 6 are operating gears 11 fast thereto. Spur gears 12 are splined on the upper portion of the screw 7 for movement thereon. When lowered, the said gears 12 engage with the gears 11 and when raised said gears 12 disengage said gears 11. A shaft 13 is journaled in bearings 14 on the arched axle and is provided at its ends with miter gears 15, which engage similar gears 16 on the upper ends of the shaft 6. At a point near the center of said shaft 15 is a worm wheel 17, which is engaged by a worm 18 on a longitudinally-disposed shaft 19, said shaft being supported in an inclined position by a bracket bearing 20, in which it is journaled and which is secured to the axle 3. At the rear end of the said worm shaft is a hand-wheel 21, by which it may be turned to cause the worm and worm gear to rotate the shaft 13, so that the screw 6, 7, may be driven by said shaft 13.
A seat 22 is mounted on the rear end of a seat-bar 23, which has its front end pivotally-connected, as at 24, to the said arched axle. The tongue 25, to which the draft animals are attached, is provided at its rear end with a fork 26, the arms of which have their rear ends connected to the vertical arms of the arched axle.

Braces 27 connect said fork arms and said vertical axle arms. A rock-shaft 28 is journaled in bearings 29 on the arched axle 3 and is provided with rock-arms 30, which are provided with forks 31 that engage grooved hubs of the gears 12 to cause said gears 12 to be raised and disengaged from the gears 11 when said shaft 28 is partially turned in one direction. Springs 31ª are provided on the upper ends of the screws 7, which bear on the gears 12 and serve to normally depress said gears and cause them to engage the gears 11. The shaft 28 has an arm 32, projecting at right angles therefrom. A lever 33 is mounted on the seat-supporting bar 23, so that it may be operated by the driver and is connected by a rod 34 to the rock-arm 32 of rock-shaft 28, so that the latter may be turned to cause the gears 12 to be moved into and out of engagement with the gears 11.

The scraper, scoop or body 35 is here shown as of rectangular form, with a bottom plate 36 at its front end, vertical side walls 37 and a vertical rear wall 38. The major portion of the bottom of the scoop or body is formed by a trap 39 which is hinged at its front end to the plate 36, as at 40, so that it may be raised and lowered to close or open the bottom of the body or scoop to enable the latter to be filled or to discharge the contents thereof rearwardly therefrom, as will be understood. Operating rods 41 are provided, which in connection with springs 42 serve to normally close the bottom 39. The said rods operate and the said springs are placed in casings 43, which are secured on the sides of the scoop or body 35. A catch 44 is provided at the rear end of the scoop or body, which acts by gravity to engage and lock the bottom 39 in a closed position. A foot lever 45 is provided, which is connected to the catch 44 by a rod 46, and which enables the said catch to be disengaged from the bottom 39, after the body or scoop has been loaded, so that the weight of the load will cause the bottom to open and hence the load will become discharged by its own gravity rearwardly from the scoop or body.
The rear portion of the scoop or body is connected to a seat-supporting bar 23 by link-rods 47, which are pivotally connected to the sides of the body and to the seat-supporting bar to cause the seat-supporting bar, together with the seat thereon to be raised and lowered with the scoop or body. Link-rods 48 have their upper ends pivotally connected to the traveling nuts 9 and their lower front ends pivotally connected to the sides of the body or scoop at a suitable distance from the front end of the latter. Link-arms 49 are similarly connected to the sides of the scoop or body at a point at some distance in the rear end thereof, and are also pivotally connected to the traveling nuts 10.

Assuming that the gears 12 are in engagement with the gears 11, the body or scoop 35 may be raised or lowered by turning the shaft 13 by the means herein-before described, the motion of said shaft 13 being communicated to the screws 6, 7, and the latter serving to raise or lower the traveling nuts which are connected to and serve to support the scoop or body. When it is desired to raise the front end of the scoop or body somewhat, after the same has been loaded, to dispose said socket or body in tilted position and prevent any of the load from dropping out of its front end, the gears 12 must be first disengaged from the gears 11 and the screw 6 caused to be rotated in the required direction to move the traveling nuts upwardly thereon. As soon as the scoop or body has been tilted to the required extent, the gears 12 will be engaged with the gears 11 and the screws 6 and 7 will be caused by the means herein-before described, to raise the nuts 9, 10, simultaneously, and hence cause the entire body or scoop, together with the load therein, to be raised.

From the foregoing description, it will be understood that my improved wheeled scraper may be operated by the driver and the team, that the machine is entirely under control of the driver and that no other person will be needed either in loading, raising, tilting the machine, or in causing the same to dump its contents. Since the scoop or body may be raised and lowered at will, it may be readily raised to such a height as to enable it to clear stumps, stones and other obstacles, and hence greatly facilitate the operation thereof.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claims.

Having thus described my invention, what I claim as new, and desire to secure by Letters-Patent, is,—

1. In a wheel scraper, the combination of an arched axle, elevating screws carried thereby, means to rotate said screws, a scoop or body, traveling nuts on said screws, and connections between the said nuts and the scoop or body to support said scoop or body.

2. In a wheel scraper, the combination of an arched axle, reversely threaded elevating screws carried thereby, means to rotate said screws, traveling nuts on said screws, a scoop or body, and connections between the same and the nuts, to support said scoop or body and cause the same to be raised or lowered by the nuts and screws.

3. In a scraper, the combination of a supporting element, reversely threaded elevating screws carried thereby, gears connecting them for simultaneous revolution in reverse directions, means to revolve said screws, means to disconnect said gears, traveling nuts on said screws, a scoop or body, and supporting connections between the latter and the traveling nuts.

4. In a scraper, the combination of a supporting element, pairs of reversely threaded elevating screws carried thereby and disposed on opposite sides thereof, driving gears for one pair of similarly threaded screws, gears connecting the dissimilarly threaded pair of screws, means to connect and disconnect the last-named gears, a scoop or body, traveling nuts on the respective screws, and supporting connections between said nuts and the scoop or body.

5. A scraper having a body provided with a hinged, downwardly opening bottom, springs connected to said bottom to close the same when the body is empty, and means to lock said bottom in a closed position.

In testimony whereof I have hereunto set my hand in presence of two subscribing witnesses.

ADAM S. ROWSEY.

Witnesses:
PATRICK H. GRIFFIN,
NORMAN I. GREIVE.